(12) United States Patent
Payne et al.

(10) Patent No.: US 8,781,520 B2
(45) Date of Patent: Jul. 15, 2014

(54) MOBILE DEVICE HAVING HYBRID KEYPAD

(75) Inventors: Gregory Payne, Charlotte, NC (US); Timothy R. Fitch, Syracuse, NY (US)

(73) Assignee: Hand Held Products, Inc., Fort Mill, SC (US)

(*) Notice: Subject to any disclaimer, the term of this patent is extended or adjusted under 35 U.S.C. 154(b) by 362 days.

(21) Appl. No.: 12/693,934

(22) Filed: Jan. 26, 2010

(65) Prior Publication Data
US 2011/0183718 A1  Jul. 28, 2011

(51) Int. Cl.
*H04M 1/00* (2006.01)

(52) U.S. Cl.
USPC .................................................. 455/550.1

(58) Field of Classification Search
CPC .................................................. G06F 3/0219
USPC .............. 455/566, 186.2, 50.1; 345/156, 179, 345/169; 374/168, 169, 172, 173
See application file for complete search history.

(56) References Cited

U.S. PATENT DOCUMENTS

| | | | |
|---|---|---|---|
| 5,059,048 A * | 10/1991 | Sirkin | 400/486 |
| 6,109,528 A * | 8/2000 | Kunert et al. | 235/472.01 |
| 6,370,018 B1 * | 4/2002 | Miller et al. | 361/679.08 |
| 6,445,381 B1 | 9/2002 | Chou | |
| 6,542,091 B1 | 4/2003 | Rasanen | |
| 6,632,038 B2 | 10/2003 | Trotman | |
| 6,677,927 B1 | 1/2004 | Bruck et al. | |
| 6,712,534 B2 | 3/2004 | Patel | |
| D497,907 S | 11/2004 | Griffin | |
| 6,867,763 B2 | 3/2005 | Griffin et al. | |
| 6,873,317 B1 | 3/2005 | Griffin et al. | |
| 6,919,879 B2 | 7/2005 | Griffin et al. | |
| 6,932,525 B2 | 8/2005 | Trotman | |
| 6,948,868 B2 | 9/2005 | Benson | |
| D514,541 S | 2/2006 | Tyneski et al. | |
| D516,547 S | 3/2006 | Tyneski et al. | |
| D516,548 S | 3/2006 | Corley et al. | |
| D517,037 S | 3/2006 | Corley et al. | |
| D517,056 S | 3/2006 | Griffin | |
| 7,030,861 B1 | 4/2006 | Westerman et al. | |
| D521,485 S | 5/2006 | Tyneski et al. | |
| D521,506 S | 5/2006 | Tyneski et al. | |
| D521,973 S | 5/2006 | Tyneski et al. | |
| D521,989 S | 5/2006 | Tyneski et al. | |
| D522,484 S | 6/2006 | Griffin | |
| D522,485 S | 6/2006 | Griffin | |
| D522,486 S | 6/2006 | Corley et al. | |
| D523,006 S | 6/2006 | Corley et al. | |
| D523,007 S | 6/2006 | Corley et al. | |
| D523,423 S | 6/2006 | Corley et al. | |
| D524,302 S | 7/2006 | Corley et al. | |
| D524,303 S | 7/2006 | Griffin | |
| D524,803 S | 7/2006 | Tyneski et al. | |

(Continued)

*Primary Examiner* — David Bilodeau
(74) *Attorney, Agent, or Firm* — Additon, Higgins, Pendleton & Ashe, P.A.

(57) ABSTRACT

A mobile device comprising: a communication module for sending and receiving radio communications; a display for displaying information; a processor for controlling software and firmware operation; a keypad for entering data to the processor comprising an array of alpha keys for alpha data entry and an array of numeric keys for numeric data entry, wherein entry of alpha data does not require use of numeric keys and numeric data does not require use of alpha keys; and a housing encompassing the communication system, display, image processor and keypad configured to facilitate an operator holding the mobile device in one hand and keypad data entry with the other hand.

27 Claims, 7 Drawing Sheets

(56) References Cited

U.S. PATENT DOCUMENTS

| | | |
|---|---|---|
| D525,222 S | 7/2006 | Corley et al. |
| D525,223 S | 7/2006 | Griffin |
| D525,243 S | 7/2006 | Griffin |
| D525,244 S | 7/2006 | Corley et al. |
| D525,619 S | 7/2006 | Corley et al. |
| 7,083,342 B2 | 8/2006 | Griffin |
| D528,098 S | 9/2006 | Corley et al. |
| 7,109,973 B2 | 9/2006 | Fyke et al. |
| D530,712 S | 10/2006 | Griffin |
| 7,152,213 B2 | 12/2006 | Pu et al. |
| 7,158,120 B2 | 1/2007 | Griffin et al. |
| 7,307,620 B2 * | 12/2007 | Siddeeq ................ 345/169 |
| 2002/0034063 A1 * | 3/2002 | Miller, Jr. ............ 361/680 |
| 2003/0001018 A1 * | 1/2003 | Hussey et al. ........ 235/472.01 |
| 2005/0185788 A1 * | 8/2005 | Daw .................... 379/369 |
| 2006/0062624 A1 * | 3/2006 | Choi .................... 400/481 |
| 2006/0063571 A1 * | 3/2006 | Chadha ................ 455/575.3 |
| 2007/0211034 A1 * | 9/2007 | Griffin et al. ........ 345/169 |
| 2008/0297377 A1 * | 12/2008 | Wang et al. .......... 341/22 |
| 2010/0182242 A1 * | 7/2010 | Fields et al. ......... 345/169 |

* cited by examiner

MOBILE DEVICE HAVING HYBRID KEYPAD

FIELD OF THE INVENTION

The present invention relates to hand held mobile devices, and more particularly to a hand held mobile device having a hybrid keypad.

BACKGROUND

Mobile devices (also referred to as smart phones, handheld devices, handheld computers, PDAs, PDTs, etc.) are widely used worldwide, and may be described as pocket-sized computing devices, typically having a display screen with touch input or a miniature keypad. In some mobile devices the input and output are combined into a touch-screen interface. Mobile devices are popular because they provide the assistance and convenience of a conventional computer (laptop, notebook or otherwise) in environments where carrying one would not be practical. Enterprise digital assistants further extend the available functionality of mobile devices.

An Enterprise digital assistant (EDA) is a handheld computer adapted for usage with SME (Small to Medium Enterprise) and Enterprise business Application software|Applications as a data capture mobile device. Such data capture applications include indicia readers, biometrics, magnetic stripe, smart card and RFID data capture technologies used within communication networks such as WLANs (Wireless Local Area Networks), Bluetooth, Wide area network|WAN/LAN/Personal Area Network|PAN voice and data communications, VOIP and GPRS Edge Communications.

Efforts regarding such systems have led to continuing developments to improve their versatility, practicality and efficiency.

DETAILED DESCRIPTION

Reference will now be made to exemplary embodiments which are illustrated in the accompanying drawings. Other embodiments may be in various forms and the exemplary embodiments should not be construed as limited to the embodiments set forth herein. Rather, these representative embodiments are described in detail so that this disclosure will be thorough and complete, and will fully convey the scope, structure, operation, functionality, and potential applicability to those skilled in the art. Wherever possible, the same reference numbers will be used throughout the drawings to refer to the same or like parts.

Figure 1:
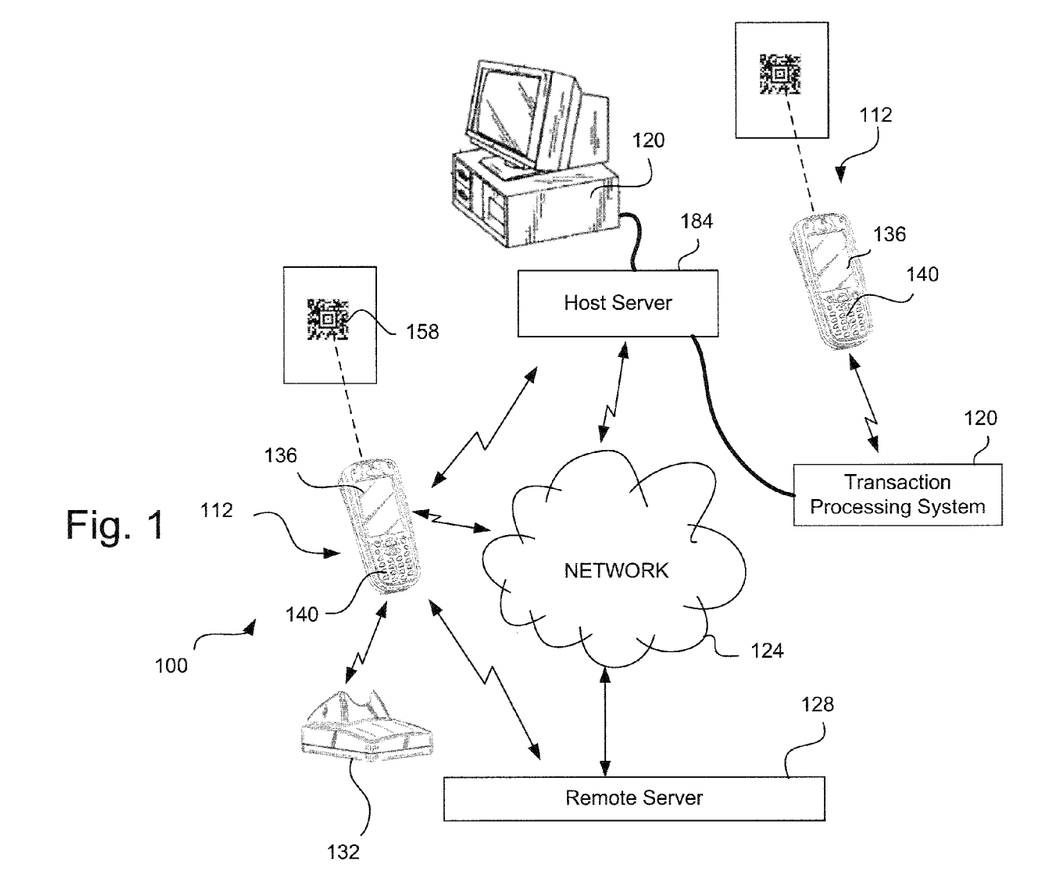
FIG. 1 is a block diagram of an exemplary mobile device system.
Figure 2:
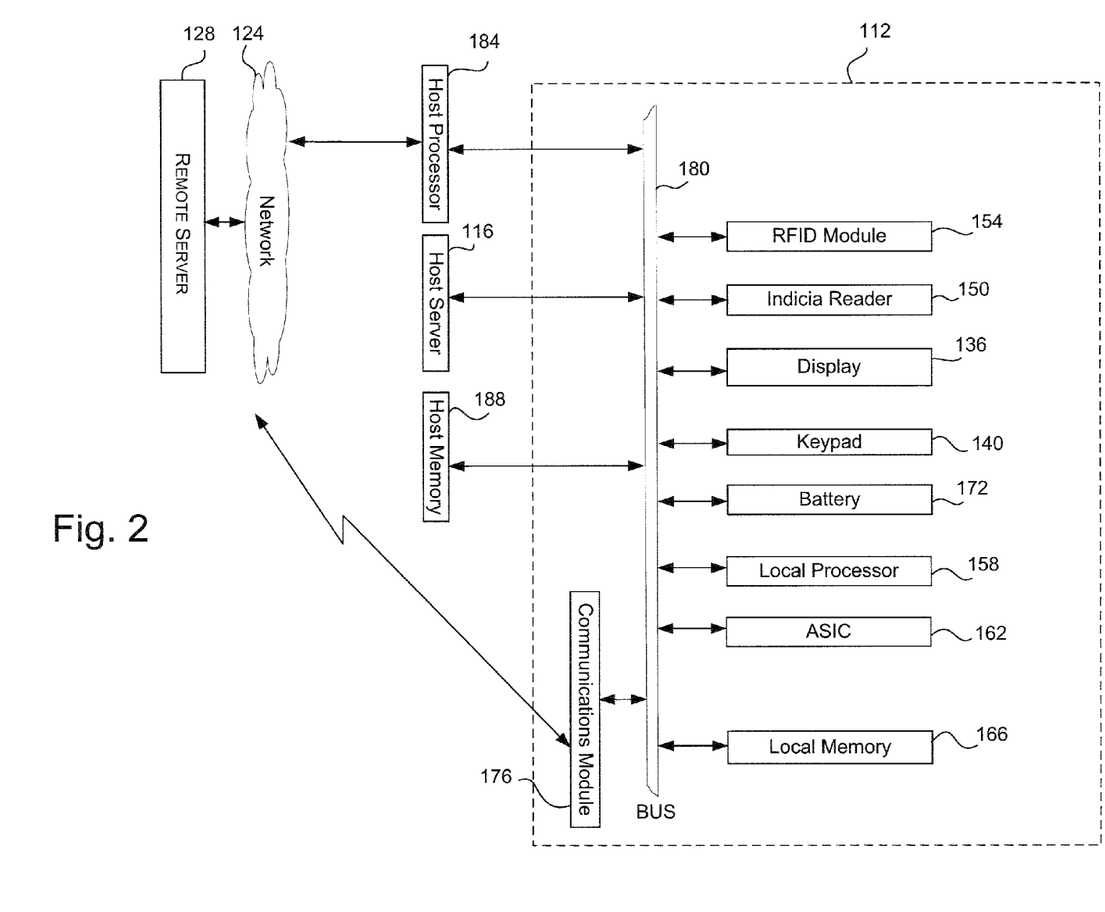
FIG. 2 is a block schematic diagram of an exemplary mobile device.

FIGS. 1 and 2 illustrate an exemplary mobile device system 100 configuration, wherein a plurality of mobile devices 112 are being operated or utilized which may be in communication (wired or wireless) with other mobile devices 112, a local host/sever 116, point of transaction processing system 120 such as a cash register, customer station or employee station, a network 124, a remote/web server 128, a base unit 132 or other systems and devices having communication capabilities. The systems illustrated in FIGS. 1 and 2 may be in communication directly with each other or indirectly through other devices, networks, servers or systems.

The mobile devices may be operated or utilized in a remote location, such as in an establishment, a store point of transaction (POT), a warehouse, a delivery truck, in the field, etc. Distances for communications from the mobile device may be short (a few meters as in television remote control) or very long (thousands or even millions of kilometers for radio communications). Wireless communication may involve radio frequency communication and may involve point-to-point communication, point-to-multipoint communication, broadcasting, cellular networks and other wireless networks. This may involve: cordless telephony such as DECT (Digital Enhanced Cordless Telecommunications); Cellular systems such as 0G, 1G, 2G, 3G or 4G; Short-range point-to-point communication such as IrDA or RFID (Radio Frequency Identification), Wireless USB, DSRC (Dedicated Short Range Communications); Wireless sensor networks such as ZigBee; Personal area networks such as Bluetooth or Ultra-wideband (UWB from WiMedia Alliance); Wireless computer networks such as Wireless Local Area Networks (WLAN), IEEE 802.11 branded as WiFi or HIPERLAN; or Wireless Metropolitan Area Networks (WMAN) and Broadband Fixed Access (BWA) such as LMDS, WiMAX or HIPERMAN.

Mobile devices may be utilized as part of Mobile Enterprise (Mobile ERP), which is a collection of Online Interactive Business Applications such as SMS and E-mail. Business modules, functions and operations executed using Mobile Enterprise include Collaboration, Document management system (DMS), Customer relationship management (CRM), Point of sale (POS), Human resource management systems (HRMS), Accounting software, Enterprise resource planning (ERP), including sales order, sourcing, tender, request for Quotation, purchase order, shipment, receiving, warehousing, inventory control, delivery order, invoicing, customer service order, production monitoring and control, work order, as well as basic utilities such as corporate calendar, corporate address book, corporate bulletin board, notes and internal messaging.

Mobile Enterprise (Mobile ERP) devices require manual data entry for various applications. The manual data entry can be labor intensive and requires the user to be very precise when entering the data.

The mobile device may have a data capture system, such as an indicia reader 150 or RFID module 154 for capturing machine readable data. A human operator may aim a handheld mobile device having an indicia reader at a target containing an information bearing indicia (IBI) 158 or dataform, text, or other element and actuate a trigger on the mobile device. An IBI or dataform may be an originally machine generated symbology that is also machine readable, such as a 1-D barcode, a 2-D barcode, a 1-D stacked barcode, a logo, glyphs, color-codes, etc.

Other exemplary subsystems or components provided within the housing of a mobile device include a local processor 158, an ASIC 162, local memory 166, a battery 172, a communications module 176 which may communicate via one or more bus 180, data lines or other signal or data communication form. The mobile device may communicate to a local server 116, host processor 184, host memory 188, network 124 or remote server 128.

An exemplary host or local processor may be utilized to perform a number of functional operations, which may involve the performance of a number of related steps, the particulars of which may be determined by or based upon certain configuration settings stored in memory. An exemplary function of a processor may be to decode machine readable information bearing indicia provided within a target or captured image. One dimensional symbologies may include very large to ultra-small, Code 128, Interleaved 2 of 5, Codabar, Code 93, Code 11, Code 39, UPC, EAN, MSI, or other 1D symbologies. Stacked 1D symbologies may include PDF, Code 16K, Code 49, or other stacked 1D symbologies. 2D symbologies may include Aztec, Datamatrix, Maxicode, QR-code, or other 2D symbologies. Decoding is a term used to describe the interpretation of an information bearing indicia captured in an image which has data or information encoded therein.

Figure 3:
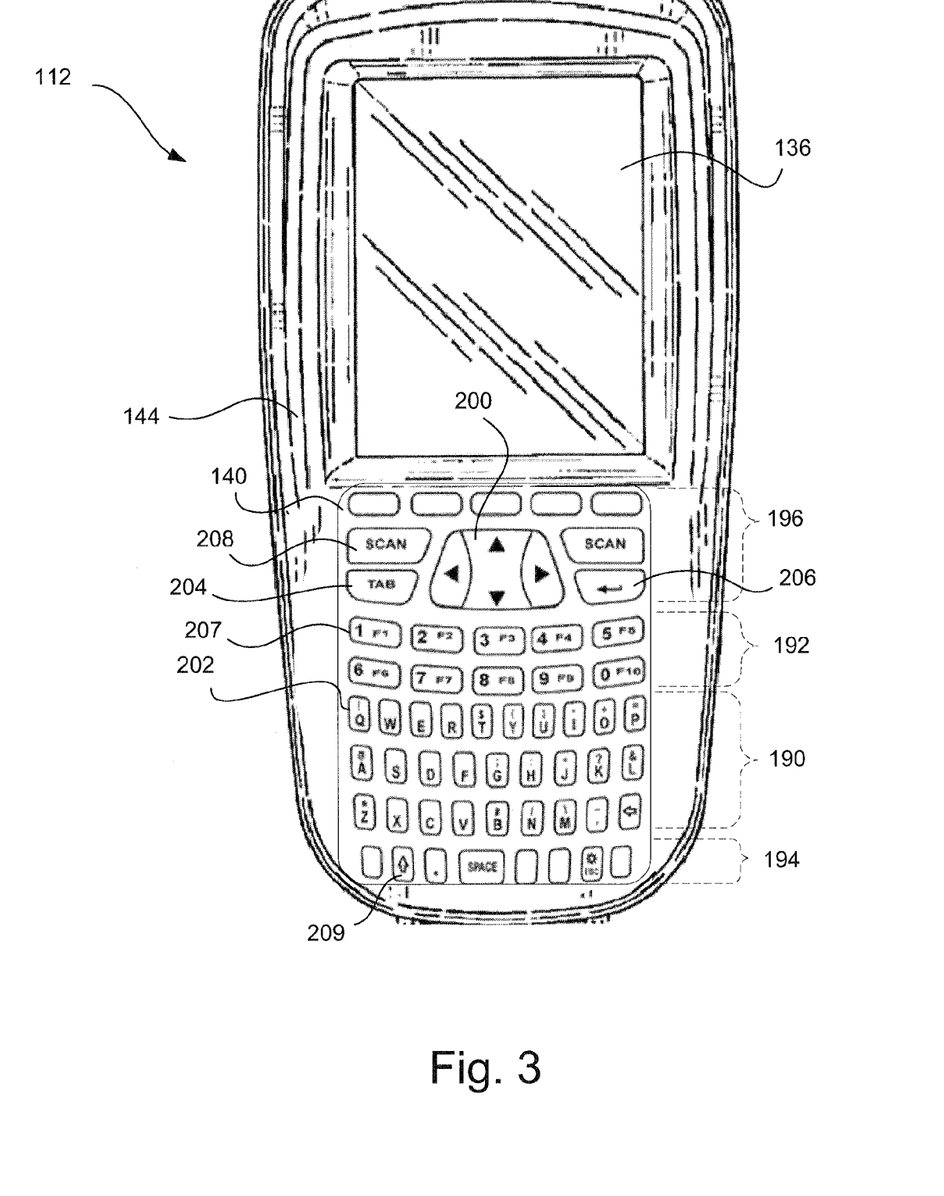
FIG. 3 is a front view of an exemplary mobile device.

FIG. 3 illustrates an exemplary mobile device 112 having a display 136 and a keypad 140 contained within a housing 144 designed, contoured or adapted for hand held operation. What is meant by hand held operation is that the mobile device can be easily grasped and held by a user. The mobile device is a light-weight, truly portable device with a housing that is shaped so as to fit comfortably into a human hand and can be easily held and carried about without tiring the user.

Exemplary keypad 140 may be comprised of multiple function data entry keys capable of inputting at least two different types of alphanumeric information selected from the group consisting of letters, numbers, punctuation symbols, functions, etc. An exemplary hybrid keypad 140 layout and design has separate arrays of numeric keys and alpha keys to provide an intuitive interface for mobile device users to enter Mobile ERP data and interact with applications.

Exemplary hybrid keypad 140 comprises an alpha QWERTY key array for familiar alpha data entry and a separate or dedicated numeric key array for numeric data entry without the requirement to shift the keys or device of the alpha key array. QWERTY is an English keypad layout utilized for computer and typewriter keypads, taking its name from the first six characters seen in the far left of the keypad's top row of letters. There may be a large number of different keypad layouts used for different languages and generally is divided into three main families according to where the Q, A, and Z keys are located.

Exemplary hybrid keypad 140 may be comprised of a QWERTY alpha key array or section 190 of three essentially curvilinear rows of keys with the letters, symbols or punctuations of the English alphabet and other keys to perform certain functions other than typing, such as backspacing or returning.

Above the alpha key section may be a numeric key array or section 192 of two essentially curvilinear rows of keys with numbers, the first row having numbers 1-5 and the second row having numbers 6-0.

Below the alpha key section is a bottom key section 194, which may be considered part of the QWERTY alpha keypad section 190 and may be comprised of a row of keys used for typing keys other than alpha keys, such as a space key, a shift key, a period, an escape key, etc.

Above the numeric keys section is a command key section 196 comprised of single-purpose keys whose depression activates a function which does not involve the direct input of alphanumeric data, such as scrolling keys 200, tab keys 204, enter or return function keys 206, keys 208 to initiate or activate image capture, data capture, scanning or reading of an IBI, etc.

Exemplary alpha input keys may have several functions or multifunction capability. For example, a key 202 can input the letter Q or an explanation point (!). The letter Q is entered by the key 202 when the keypad 140 is in its default mode. The explanation point is entered by pressing a shift key 209 to put the keypad 140 into an alternate key mode.

Exemplary numeric input keys may have multifunction capability by having the ability to activate functions which do not involve the direct input of alphanumeric data. For example, a key 207 can input the number 1 or perform a function F1. The number 1 is entered by the key 207 when the keypad 140 is in its default mode. The function F1 is entered by pressing shift key 209 and putting the keypad 140 into an alternate key mode. The function F1 may cause the mobile device to perform a number of functions, such as enter the device into a computation mode, communication mode, imaging mode, scanning mode, etc.

Figure 4:
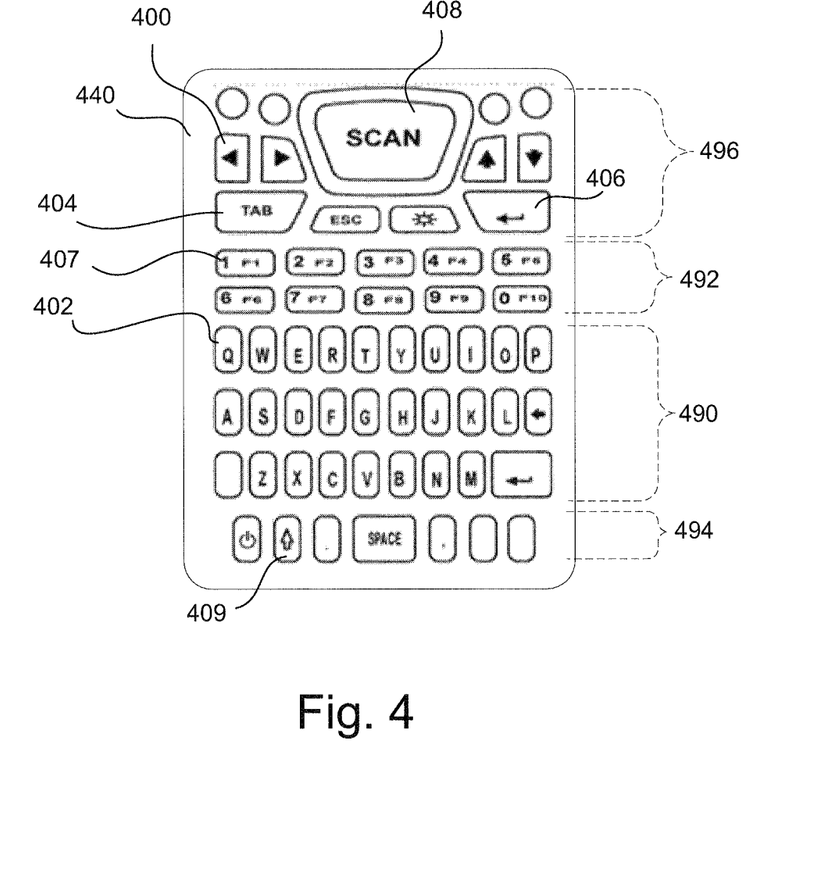
FIG. 4 is a front view of an exemplary mobile device keypad.

FIG. 4 illustrates an exemplary keypad comprised of multiple function data entry keys capable of inputting at least two different types of alphanumeric information selected from the group consisting of letters, numbers, punctuation symbols, functions, etc. An exemplary hybrid keypad 440 layout and design has separate arrays of numeric keys and alpha keys to provide an intuitive interface for mobile device users to enter alphanumeric data and interact with applications. The keys may be arranged in essentially linear and horizontal rows of two or more adjacent numeric keys which lie essentially in a linear line in a essentially horizontal plane. Exemplary mobile device and/or typewriting commands are well known to those skilled in the art.

Exemplary hybrid keypad 440 comprises an alpha QWERTY keypad layout for familiar alpha data entry and separate dedicated numeric keys for numeric data entry without the requirement to shift the keys or device. QWERTY is an English keypad layout utilized for computer and typewriter keypads, taking its name from the first six characters seen in the far left of the keypad's top row of letters. There may be a large number of different keypad layouts used for different languages and generally is divided into three main families according to where the Q, A, and Z keys are placed on the keypad.

Exemplary hybrid keypad 440 may be comprised of a QWERTY alpha key section 490 of three essentially linear rows of keys with the letters, symbols or punctuations of the English alphabet and other keys to perform certain functions other than typing, such as backspacing or returning.

Above the alpha key section may be a numeric key section 492 of two essentially linear rows of keys with numbers, the first row having numbers 1-5 and the second row having numbers 6-0.

Below the alpha key section is a bottom key section 494, which may be considered part of the QWERTY alpha keypad section 490 and may be comprised of a row of keys used for typing keys other than alpha keys, such as a space key, a shift key, a period, an escape key, etc.

Above the numeric keys section is a command key section 496 comprised of single-purpose keys whose depression activates a function which does not involve the direct input of alphanumeric data, such as scrolling keys 400, tab keys 404, enter or return function keys 406, keys 408 to initiate or activate image capture, data capture, scanning or reading of an IBI, etc. An additional return enter or return function key 406 may be located in the alpha key section 490.

Exemplary alpha keys in section 490 may not have multifunction capability.

Exemplary numeric input keys may have multifunction capability by having the ability to activate functions which do not involve the direct input of alphanumeric data. For example, a key 407 can input the number 1 or perform a function F1. The number 1 is entered by the key 407 when the keypad 440 is in its default mode. The function F1 is entered by pressing shift key 409 and putting the keypad 440 into an alternate key mode. The function F1 may cause the mobile device to perform a number of functions, such as enter the device into a computation mode, communication mode, imaging mode, scanning mode, etc.

Figure 5:
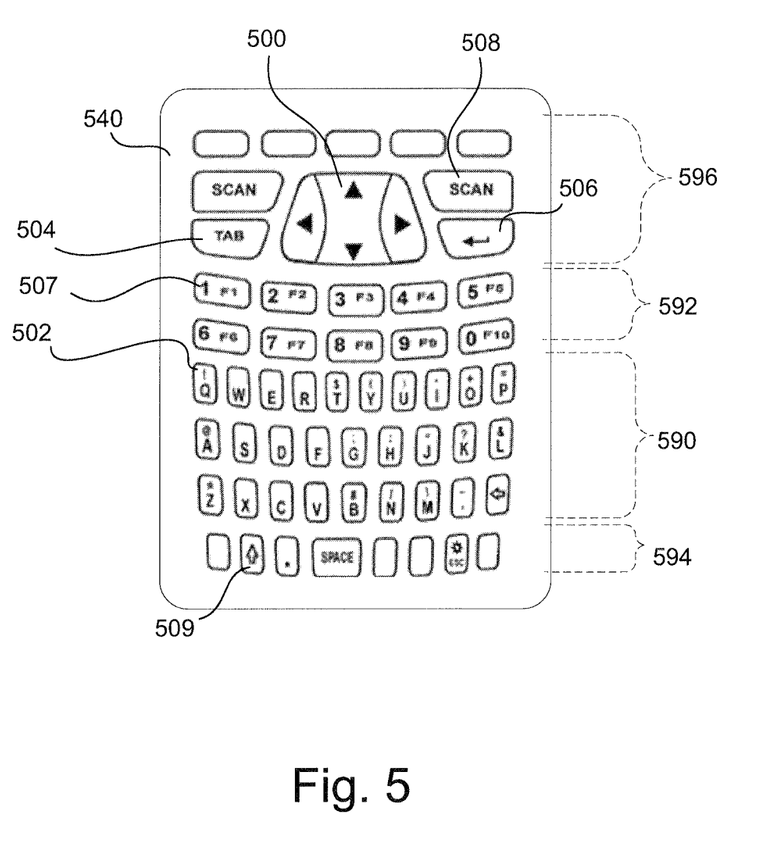
FIG. 5 is a front view of an exemplary mobile device keypad.

FIG. 5 illustrates an exemplary keypad comprised of multiple function data entry keys capable of inputting at least two different types of alphanumeric information selected from the group consisting of letters, numbers, punctuation symbols, functions, etc. An exemplary hybrid keypad 540 layout and design has separate arrays of numeric keys and alpha keys to provide an intuitive interface for mobile device users to enter Mobile ERP data and interact with applications.

The keys may be arranged in essentially linear and horizontal rows of two or more adjacent numeric keys which lie essentially in a curvilinear line in a essentially horizontal plane. Exemplary mobile device and/or typewriting commands are well known to those skilled in the art.

Exemplary hybrid keypad 540 comprises an alpha QWERTY keypad layout for familiar alpha data entry and separate dedicated numeric keys for numeric data entry without the requirement to shift the keys or device. QWERTY is an English keypad layout utilized for computer and typewriter keypads, taking its name from the first six characters seen in the far left of the keypad's top row of letters. There may be a large number of different keypad layouts used for different languages and generally is divided into three main families according to where the Q, A, and Z keys are placed on the keypad.

Exemplary hybrid keypad 540 may be comprised of a QWERTY alpha key section 590 of three essentially curvilinear rows of keys with the letters, symbols or punctuations of the English alphabet and other keys to perform certain functions other than typing, such as backspacing or returning.

Above the alpha key section may be a numeric key section 592 of two essentially curvilinear rows of keys with numbers, the first row having numbers 1-5 and the second row having numbers 6-0.

Below the alpha key section is a bottom key section 594, which may be considered part of the QWERTY alpha keypad section 590 and may be comprised of a row of keys used for typing keys other than alpha keys, such as a space key, a shift key, a period, an escape key, etc.

Above the numeric keys section is a command key section 596 comprised of single-purpose keys whose depression activates a function which does not involve the direct input of alphanumeric data, such as scrolling keys 500, tab keys 504, enter or return function keys 507, keys 508 to initiate or activate image capture, data capture, scanning or reading of an IBI, etc.

Exemplary alpha input keys may have multifunction capability by having the ability to have several functions. For example, a key 502 can input the letter Q or an explanation point (!). The letter Q is entered by the key 502 when the keypad 540 is in its default mode. The explanation point is entered by pressing a shift key 509 to put the keypad 540 into an alternate key mode.

Exemplary numeric input keys may have multifunction capability by having the ability to have several functions. For example, a key 507 can input the number 1 or perform a function F1. The number 1 is entered by the key 507 when the keypad 540 is in its default mode. The function F1 is entered by pressing shift key 509 and putting the keypad 540 into an alternate key mode. The function F1 may cause the mobile device to perform a number of functions, such as enter the device into a computation mode, communication mode, imaging mode, scanning mode, etc.

Figure 6:
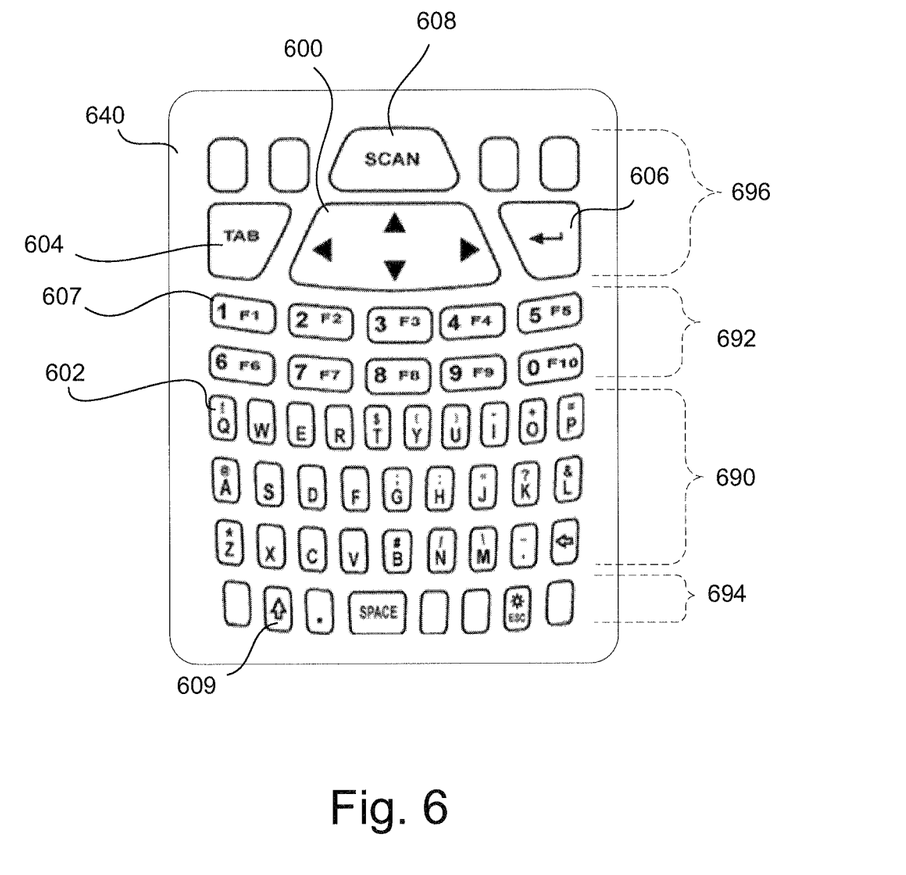
FIG. 6 is a front view of an exemplary mobile device keypad.

FIG. 6 illustrates an exemplary keypad comprised of multiple function data entry keys capable of inputting at least two different types of alphanumeric information selected from the group consisting of letters, numbers, punctuation symbols, functions, etc. An exemplary hybrid keypad 640 layout and design has separate arrays of numeric keys and alpha keys to provide an intuitive interface for mobile device users to enter Mobile ERP data and interact with applications. The keys may be arranged in essentially linear and horizontal rows of two or more adjacent numeric keys which lie essentially in a curvilinear line in a essentially horizontal plane. Exemplary mobile device and/or typewriting commands are well known to those skilled in the art.

Exemplary hybrid keypad 640 comprises an alpha QWERTY keypad layout for familiar alpha data entry and separate dedicated numeric keys for numeric data entry without the requirement to shift the keys or device. QWERTY is an English keypad layout utilized for computer and typewriter keypads, taking its name from the first six characters seen in the far left of the keypad's top row of letters. There may be a large number of different keypad layouts used for different languages and generally is divided into three main families according to where the Q, A, and Z keys are placed on the keypad.

Exemplary hybrid keypad 640 may be comprised of a QWERTY alpha key section 690 of three essentially curvilinear rows of keys with the letters, symbols or punctuations of the English alphabet and other keys to perform certain functions other than typing, such as backspacing or returning.

Above the alpha key section may be a numeric key section 692 of two essentially curvilinear rows of keys with numbers, the first row having numbers 1-5 and the second row having numbers 6-0.

Below the alpha key section is a bottom key section 694, which may be considered part of the QWERTY alpha keypad section 690 and may be comprised of a row of keys used for typing keys other than alpha keys, such as a space key, a shift key, a period, an escape key, etc.

Above the numeric keys section is a command key section 696 comprised of single-purpose keys whose depression activates a function which does not involve the direct input of alphanumeric data, such as scrolling keys 600, tab keys 604, enter or return function keys 607, keys 608 to initiate or activate image capture, data capture, scanning or reading of an IBI, etc.

Exemplary alpha input keys may have several functions or multifunction capability. For example, a key 602 can input the letter Q or an explanation point (!). The letter Q is entered by the key 602 when the keypad 640 is in its default mode. The explanation point is entered by pressing a shift key 609 to put the keypad 640 into an alternate key mode.

Exemplary numeric input keys may have multifunction capability by having the ability to have several functions. For example, a key 607 can input the number 1 or perform a function F1. The number 1 is entered by the key 607 when the keypad 640 is in its default mode. The function F1 is entered by pressing shift key 609 and putting the keypad 640 into an alternate key mode. The function F1 may cause the mobile device to perform a number of functions, such as enter the device into a computation mode, communication mode, imaging mode, scanning mode, etc.

Figure 7:
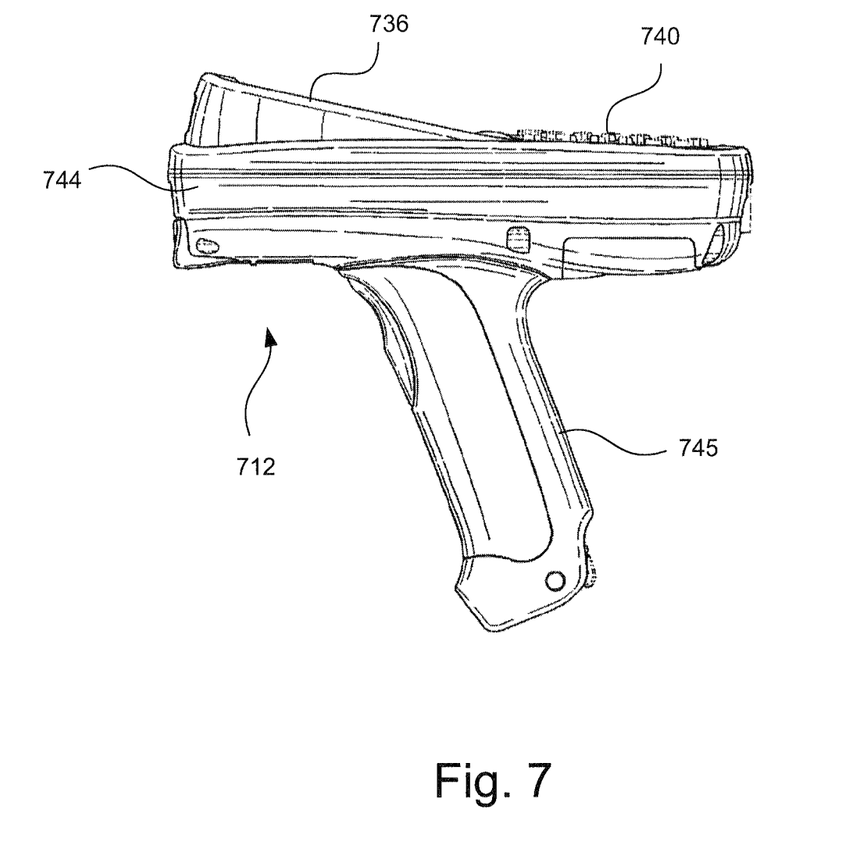
FIG. 7 is a side view of an exemplary mobile device.

FIG. 7 illustrates an exemplary hand held mobile device 712 having a keypad 740 and display or touch screen 736 disposed in a housing 744. A handle 745 extending vertically below the housing may be included as either attached to or a part and parcel with the mobile device. The handle may make it easier for a user to hold the device while operating the keypad. The mobile device may have an indicia reader. If so, the handle 745 may be easily grasped and held by a user so that the mobile device can be rapidly trained upon an IBI situated some distance from the user. The mobile device preferably is a light-weight, truly portable device that can be easily held and carried about without tiring the user.

An exemplary mobile device comprises: a communication module for sending and receiving radio communications; a display for displaying information; a processor for controlling software and firmware operation; a keypad for entering data to the processor comprising an array of alpha keys for alpha data entry and an array of numeric keys for numeric data entry, wherein entry of alpha data does not require use of numeric keys and numeric data does not require use of alpha keys; and a housing encompassing the communication system, display, image processor and keypad configured to facilitate an operator holding the mobile device in one hand and keypad data entry with the other hand.

The invention claimed is:

1. A mobile device comprising:
   a communication module for sending and receiving radio communications;
   a display for displaying information; a processor for controlling software and firmware operation;
   a keypad for entering data to the processor comprising an array of alpha keys for alpha data entry and an array of numeric keys for numeric data entry,
   wherein entry of alpha data does not require use of numeric keys and entry of numeric data does not require use of alpha keys,
   wherein the array of numeric keys is disposed in two upwardly-curvilinear rows of keys with numbers, a first row having numbers 1-5 and a second row having numbers 6-0, and the array of alpha keys is disposed in a total of four rows of keys which are less curvilinear than the numbered keys; and,
   a housing encompassing the communication module, the display, the processor and the keys.

2. A mobile device in accordance with claim 1, wherein the numeric keys and/or the alpha keys are multi-functional wherein they may be utilized for data entry other than alpha or numeric data.

3. A mobile device in accordance with claim 1, wherein the housing includes a handle extending vertically below the mobile device.

4. A mobile device in accordance with claim 1, further comprising an indicia reader for reading information bearing indicia and a button for activating indicia reading.

5. A mobile device in accordance with claim 1, further comprising a data capture system and a button for activating data capture.

6. A mobile device in accordance with claim 1, wherein the mobile device is configured to facilitate an operator holding the mobile device in one hand and keypad key data entry with the other hand.

7. A mobile device in accordance with claim 1, wherein the array of alpha keys comprises a separate key for each letter.

8. A mobile device in accordance with claim 1, wherein some of the rows of alpha keys extend essentially the same distance as the rows of numeric keys.

9. A mobile device in accordance with claim 1, wherein the alpha key array is arranged in essentially curvilinear rows.

10. A mobile device comprising:
    a communication module for sending and receiving radio communications; a display for displaying information;
    a processor for controlling software and firmware operation; a keypad for entering data to the processor comprising a QWERTY array of alpha keys for alpha data entry and an array of numeric keys for numeric data entry,
    wherein entry of alpha data does not require use of numeric keys and numeric data does not require use of alpha keys,
    wherein the array of numeric keys is disposed in two upwardly-curvilinear rows of keys with numbers, a first row having numbers 1-5 and a second row having numbers 6-0, and the QWERTY array of alpha keys is disposed in a total of four rows of keys which are less curvilinear than the numbered keys; and,
    a housing encompassing the communication module, the display, the processor and the keys.

11. A mobile device in accordance with claim 10, wherein the numeric keys are arranged with the first row of numbers 1-5 being a top row of numbers 1-5 and the second row of numbers 6-0 being a bottom row of numbers 6-0.

12. A mobile device in accordance with claim 10, wherein the numeric keys and/or the alpha keys are multi-functional wherein they may be utilized for data entry other than alpha or numeric data.

13. A mobile device in accordance with claim 10, wherein the housing includes a handle extending vertically below the mobile device.

14. A mobile device in accordance with claim 10, further comprising an indicia reader for reading information bearing indicia and a button for activating indicia reading.

15. A mobile device in accordance with claim 10, further comprising a data capture system and a button for activating data capture.

16. A mobile device in accordance with claim 10, wherein the alpha key array is arranged in essentially curvilinear rows.

17. A mobile device in accordance with claim 10, wherein the mobile device is configured to facilitate an operator holding the mobile device in one hand and keypad key data entry with the other hand.

18. A mobile device in accordance with claim 10, wherein the array of alpha keys comprises a separate key for each letter.

19. A mobile device in accordance with claim 10, wherein some of the rows of alpha keys extend essentially the same distance as the rows of numeric keys.

20. A mobile device comprising:
    a communication module for sending and receiving radio communications;
    a display for displaying information; a processor for controlling software and firmware operation;
    a keypad for entering data to the processor comprising an array of alpha keys for alpha data entry and an array of numeric keys for numeric data entry, wherein entry of alpha data does not require use of numeric keys and entry of numeric data does not require use of alpha keys,
    wherein the array of alpha keys is disposed in a total of four rows of keys, and the array of numeric keys is disposed in two upwardly-curvilinear rows of keys with numbers, a first row having numbers 1-5 and a second row having numbers 6-0, wherein the alpha keys are less curvilinear than the numbered keys and,
    a housing encompassing the communication module, the display, the processor and the keys.

21. A mobile device in accordance with claim 20, wherein the array of alpha keys comprises a QWERTY array of alpha keys.

22. A mobile device in accordance with claim 20, wherein the housing includes a handle extending vertically below the mobile device.

23. A mobile device in accordance with claim 20, wherein the mobile device is configured to facilitate an operator holding the mobile device in one hand and keypad key data entry with the other hand.

24. A mobile device in accordance with claim 20, wherein the array of alpha keys comprises a separate key for each letter.

25. A mobile device in accordance with claim 20, wherein some of the rows of alpha keys extend essentially the same distance as the rows of numeric keys.

26. A mobile device in accordance with claim 25, wherein the array of numeric keys is disposed above the alpha array of keys.

27. A mobile device in accordance with claim 26, wherein the array of numeric keys is arranged in essentially linear rows.

* * * * *